(12) United States Patent
Harris et al.

(10) Patent No.: US 6,237,394 B1
(45) Date of Patent: May 29, 2001

(54) APPARATUS AND METHOD FOR CORRECTING DRIFT IN A SENSOR

(75) Inventors: James M. Harris, Menlo Park; Babak Taheri, San Francisco; Errol Arkilic, Boulder Creek, all of CA (US)

(73) Assignee: Redwood Microsystems, Inc., Menlo Park, CA (US)

( * ) Notice: Subject to any disclaimer, the term of this patent is extended or adjusted under 35 U.S.C. 154(b) by 0 days.

(21) Appl. No.: 09/257,874

(22) Filed: Feb. 25, 1999

(51) Int. Cl.$^7$ .................. G01L 27/00; G01L 19/07; G01D 3/028; G01D 18/00
(52) U.S. Cl. .................. 73/1.88; 73/708; 73/1.62; 702/87; 702/98; 702/104
(58) Field of Search ................ 73/1.88, 1.01, 73/1.07, 1.15, 1.34, 1.62, 1.59, 1.61, 765, 766, 861.02, 861.03, 708; 702/87, 85, 86, 88, 6, 98, 104

(56) References Cited

U.S. PATENT DOCUMENTS

| | | | |
|---|---|---|---|
| 4,051,712 | * 10/1977 | Zias et al. | 73/1.62 |
| 4,079,625 | * 3/1978 | Mann | 73/152.59 |
| 4,927,170 | * 5/1990 | Wada | 280/5.508 |
| 5,170,549 | * 12/1992 | Julien et al. | 29/407.04 |
| 5,247,171 | * 9/1993 | Wlodarczyk et al. | 250/227.21 |
| 5,287,254 | * 2/1994 | Baert et al. | 702/99 |
| 5,422,478 | * 6/1995 | Wlodarczyk et al. | 73/708 X |
| 5,469,750 | * 11/1995 | Lloyd et al. | 73/1.34 X |
| 5,551,301 | * 9/1996 | Cowan | 73/708 |
| 5,668,320 | * 9/1997 | Cowan | 73/708 |

FOREIGN PATENT DOCUMENTS

| | | | |
|---|---|---|---|
| 3143061 A1 | * | 5/1983 | (DE) . |
| 2034592 | * | 6/1980 | (GB) . |
| 62-191259 | * | 8/1987 | (JP) . |

OTHER PUBLICATIONS

Basov et al Abstract of RU 2062993C1 by Derwent Information LTD, ACC–No 1997–106932, Derwent Week 199710 "Correction of Characteristic of Pressure Differential Flowmeter—In Which Pressure Differential at 0.09 of Nominal Value is Set and 0.3 Nominal Reading of Indictor is Set by Corrector, Before Setting Zero on Instrument After Release of Pressure" Jun. 27, 1996.*

* cited by examiner

Primary Examiner—Thomas P. Noland
(74) Attorney, Agent, or Firm—Pennie & Edmonds LLP

(57) ABSTRACT

A method of correcting drift in a sensor includes the step of identifying a calibration command. A nominal zero pressure sensor drift correction factor for the sensor is identified by relying upon a calibration voltage value and a calibration temperature value secured at a nominal zero pressure condition. Sensor output is subsequently adjusted according to the nominal zero pressure sensor drift correction factor.

6 Claims, 5 Drawing Sheets

APPARATUS AND METHOD FOR CORRECTING DRIFT IN A SENSOR

BRIEF DESCRIPTION OF THE INVENTION

This invention relates generally to sensing devices. More particularly, this invention relates to a technique of correcting drift in a sensor.

BACKGROUND OF THE INVENTION

A piezoresistive or capacitive sensor generates a change in electrical resistance or capacitance proportional to a physical force applied to it. Such sensors are commonly positioned on a silicon membrane to measure the deflection of the silicon membrane.

A number of problems arise in connection with the packaging of such sensors. For example, a silicon-based piezoresistive pressure sensor is attached to a package or substrate by means of a very soft, compliant adhesive, such that there is no residual stress or force transmitted from the package to the sensor. Should stress be transmitted to the sensor, the membrane of the sensor is deflected, creating a measured resistance value at the sensing element, which erroneously indicates a change in measured pressure. Stresses from the attachment process may add or subtract to this resistance change, depending upon the direction and magnitude of the pressure induced membrane deflection. In general, most commonly accepted calibration techniques adequately compensate for the non-ideal behavior of the pressure sensor caused by manufacturing variations and the necessity of attaching the sensor to a rigid base.

A problem with existing calibration techniques arises when the stresses from the attachment process change over time due to stress relief of the attachment material. This stress relief can be caused by exposure of the sensor, changes in the sensor surroundings, changes in the attachment material, and/or changes in the base to varying pressures and/or temperatures. Should the base, sensor, and attachment material not be closely matched in thermal expansion, then any temperature excursion produces a stress differential in the materials proportional to the difference in thermal expansion and temperature differential. In the case where the die attach material is a viscoelastic substance, it will flow over time in a fashion so as to decrease the stress. This will clearly have an impact on the piezoresistive membrane, changing the resistance value over time as well.

Typical calibration methods cannot account for the changing nature of the resistance values described above. The resistance of most sensors is a function of both temperature and pressure. One approach to model this physical activity is to use a polynomial equation of the form:

$$P = M_0 + M_1*T + M_2*T^2 + M_3*T^3 + (M_4 + M_5*T + M_6*T^2 + M_7*T^3)*V + (M_8 + M_9*T + M_{10}*T^2 + M_{11}*T^3)*V^2 + (M_{12} + M_{13}*T + M_{14}*T^2 + M_{15}*T^3)*V^3$$

(Equation I)

P is the differential pressure applied across the membrane. Each M term is a derived coefficient. T is the temperature of the sensor membrane. V is the measure of the resistance of the sensor structure. For example, V may be the voltage produced by a constant current across the piezoresistive element.

The order of the polynomial required to fit a particular pressure sensor depends upon the individual manufacturing process, the attachment technique and the degree of accuracy required. A second order fit with respect to pressure and temperature commonly suffices, although a second order fit with respect to pressure and a third order fit with respect to temperature is sometimes required.

When a non-rigid die attach material is used, the M0 term of Equation I typically changes with time as well as temperature. This term is usually referred to as the "offset", referring to the fact that in most sensors when the pressure is "zero", there is no deflection on the membrane, but there is still a non-zero signal. This is true even for a sensor using a Wheatstone bridge resistor configuration which, ideally, may be designed to give a zero signal, but with manufacturing tolerances, will produce a small signal.

This aging phenomenon can create signal level shifts of approximately 0.5 psi. This shift or drift is relatively constant across the entire pressure range of interest. At a pressure level of 40 psi, this amounts to a 1.25% error, while at 5 psi, this amounts to a 10% error. Such errors are unacceptable in most applications.

It is not practical or acceptable for a customer to re-calibrate a pressure sensor which has drifted. Thus, it would be highly desirable to provide an improved sensing device that has the capability to correct drift. Ideally, such a sensor would automatically self-correct for drift in response to a relatively simple set of conditions invoked by a customer in the field. A thorough technique would compensate for drift factors, such as sensor aging, as a function of voltage and temperature conditions.

SUMMARY OF THE INVENTION

A method of correcting drift in a sensor includes the step of identifying a calibration command. A nominal zero pressure sensor drift correction factor for the sensor is identified by relying upon a calibration voltage value and a calibration temperature value secured at a nominal zero pressure condition. Sensor output is subsequently adjusted according to the nominal zero pressure sensor drift correction factor.

The apparatus of the invention includes a micro-controller and associated electronics configured to establish a nominal zero pressure sensor drift correction factor for a sensor in response to a calibration voltage value and a calibration temperature value secured at a nominal zero pressure condition. The sensor output is subsequently modified by the micro-controller according to the nominal zero pressure sensor drift correction factor.

The invention provides an improved technique to correct drift in piezoresistive and capacitive sensors. The technique automatically self-corrects for drift in response to a relatively simple set of external conditions. Advantageously, the technique compensates for drift factors, such as sensor aging, as a function of voltage and temperature conditions as measured at a nominal zero pressure condition. The zero pressure sensor drift correction factor is then applied to other pressure conditions to achieve a correction in sensor drift.

BRIEF DESCRIPTION OF THE DRAWINGS

For a better understanding of the invention, reference should be made to the following detailed description taken in conjunction with the accompanying drawings, in which.

Like reference numerals refer to corresponding parts throughout the drawings.

DETAILED DESCRIPTION OF THE INVENTION

Figure 1:
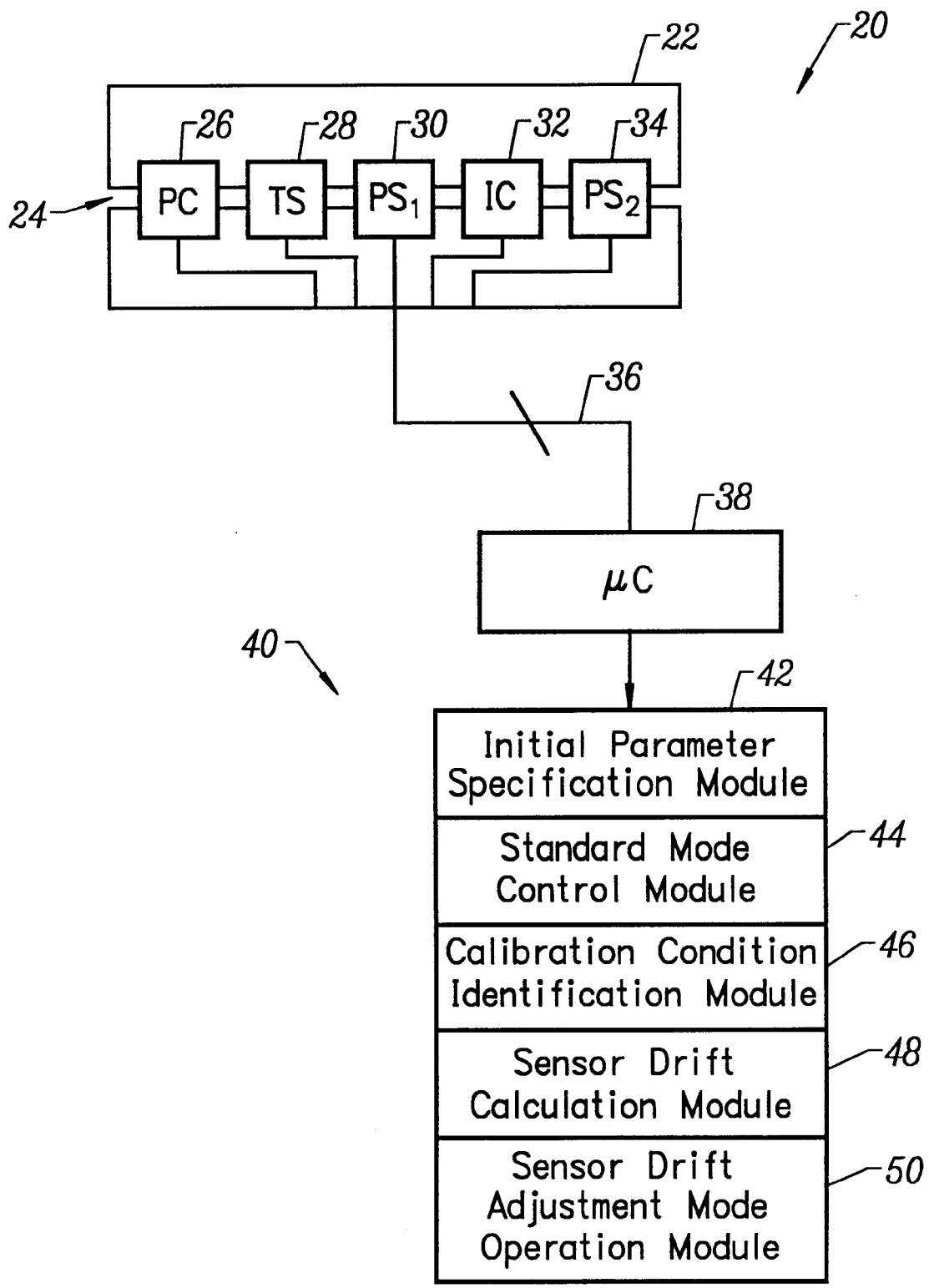
FIG. 1 illustrates a sensor drift calibration and correction apparatus constructed in accordance with an embodiment of the invention.

FIG. 1 illustrates a sensor drift correction apparatus 20 in accordance with an embodiment of the invention. The device 20 includes a sensor package 22. Because the invention establishes correction for sensor drift, the sensor package 22 may be a non-hermetic package.

The package 22 includes a conduit 24 through which a fluid passes. The conduit 24 has one or more functional devices to monitor or control the passing fluid. For example, the package 22 may be implemented to include a proportional controller 26, a temperature sensor 28, a first pressure sensor 30, an integral controller 32, and a second pressure sensor 34. The invention is directed toward the operation of pressure sensors, such as the first pressure sensor 30 and the second pressure sensor 34. Those skilled in the art will appreciate that each pressure sensor may be operated in connection with the functional devices of the type shown in FIG. 1, or other combinations of functional devices to establish devices, such as mass flow controllers, pressure controllers, mass meters, or pressure meters.

Signals from the individual functional units positioned within the package 22 are routed via individual lines or a bus 36 to a micro-controller 38 (which includes associated electronics, if necessary). The micro-controller 38 has an associated internal or external memory 40. The micro-controller 38 executes a set of programs stored in the memory 40. Alternately, the micro-controller 38 and memory 40 may be an Application Specific Integrated Circuit (ASIC), a Field Programmable Logic Device (FPLD), or other equivalent device known to those skilled in the art. Regardless of the implementation, a set of instructions are executed in accordance with the invention.

As shown in FIG. 1, the set of instructions may be generally characterized as including an initial parameter specification module 42, a standard mode control module 44, a calibration condition identification module 46, a sensor drift calculation module 48, and a sensor drift adjustment mode operation module 50. The function of each of these modules is discussed below.

Figure 2:
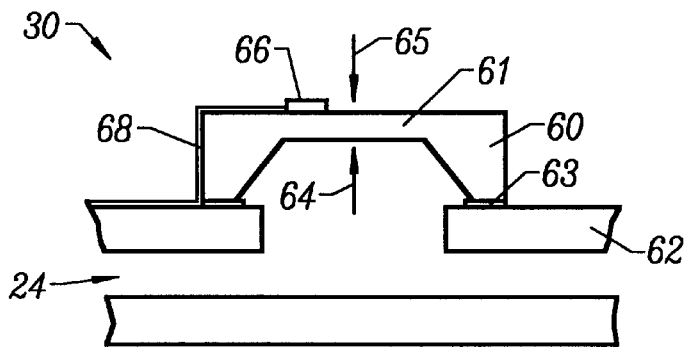
FIG. 2 illustrates a gauge sensor that may be utilized in accordance with the invention.

FIG. 2 is an enlarged side view of a pressure sensor 30 (or 34) utilized in accordance with the invention. The sensor 30 includes a micromachined gauge sensor 60 with a deflectable membrane 61. The gauge sensor 60 is attached to a substrate 62 via a non-rigid adhesive 63. Pressure created by a fluid in conduit 24, as shown with arrow 64, operates to deflect the membrane 61. An ambient pressure, as shown with arrow 65, counteracts the pressure from the fluid. For the purpose of the following discussion, the ambient pressure is assumed to be a known constant. Ideally, no ambient pressure exists; that is, there is a vacuum on the outside of the gauge sensor 60. A piezoresistive or capacitive element 66 changes resistance in response to the deflection of the membrane 61. The signal generated from the element 66 is routed away from the gauge sensor 60 via leads 68.

Figure 3:
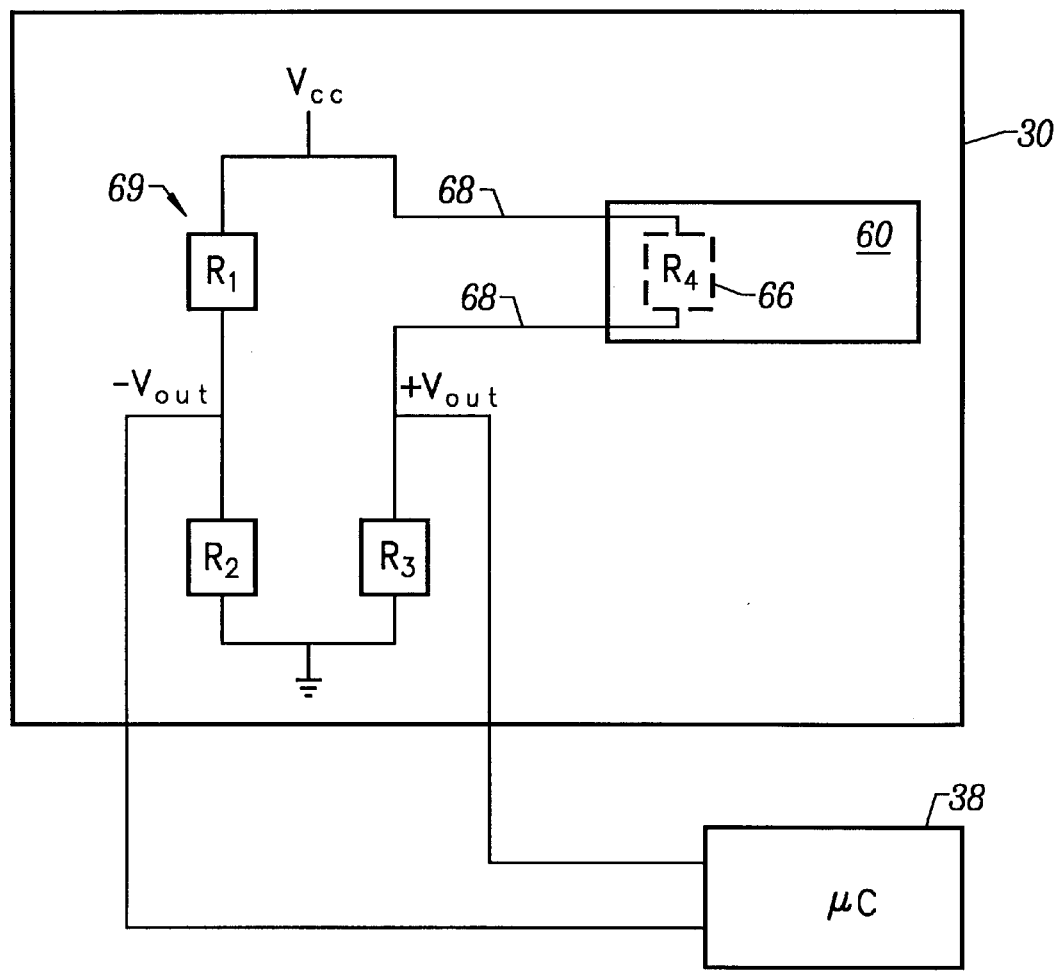
FIG. 3 illustrates a sensor and accompanying bridge circuit utilized in accordance with an embodiment of the invention.

FIG. 3 is a top view of the sensor 30. The figure shows the top of the gauge sensor 60 and the piezoresistive or capacitive element or elements 66 positioned on it. The piezoresistive element 66 operates as a resistor forming a portion of a well-known bridge circuit 69. The bridge circuit 69 includes resistors R1, R2, R3, and R4. The bridge circuit 69 may be formed in a membrane positioned on the sensor 60. Output signals +Vout and −Vout are routed to the micro-controller 38. The use of a bridge circuit 69 and associated gauge sensor 60 to obtain a signal indicative of a change in resistance is well known in the art. It is also known in the art how to map the change in resistance to a pressure value corresponding to the pressure of the fluid in the conduit 64. The invention is not directed toward these known techniques, rather the invention is directed toward processing such signals so as to compensate and correct for drift associated with a sensor, such as the gauge sensor 60.

Figure 4:
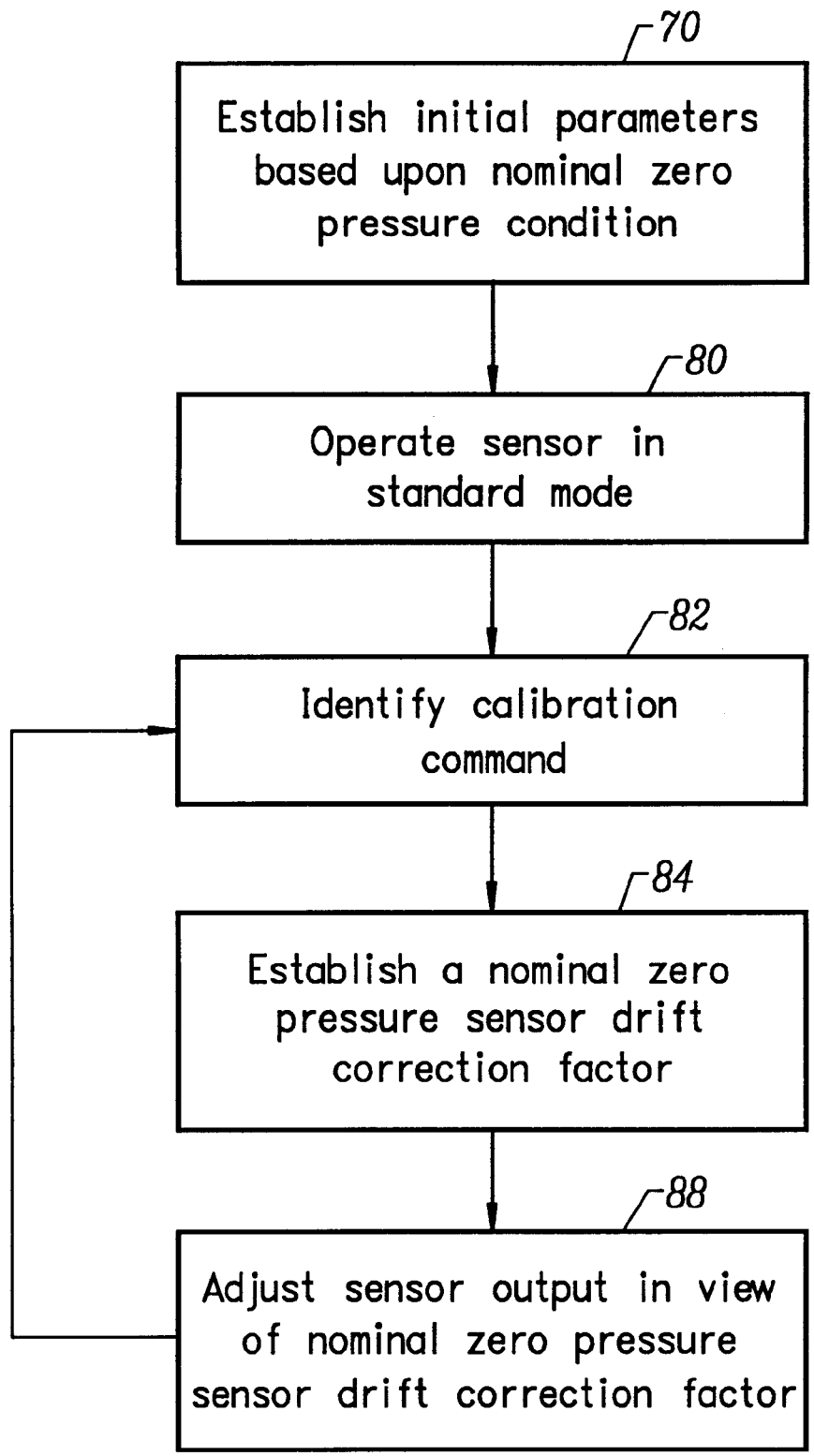
FIG. 4 illustrates sensor drift calibration and correction processing steps executed in accordance with an embodiment of the invention.

Processing steps associated with the invention are described in connection with FIG. 4. The initial processing step shown in FIG. 4 is to establish initial parameters based upon nominal zero pressure conditions (step 70). This operation may be coordinated by the initial parameter specification module 42. This operation is characterized in connection with FIG. 5.

Figure 5:
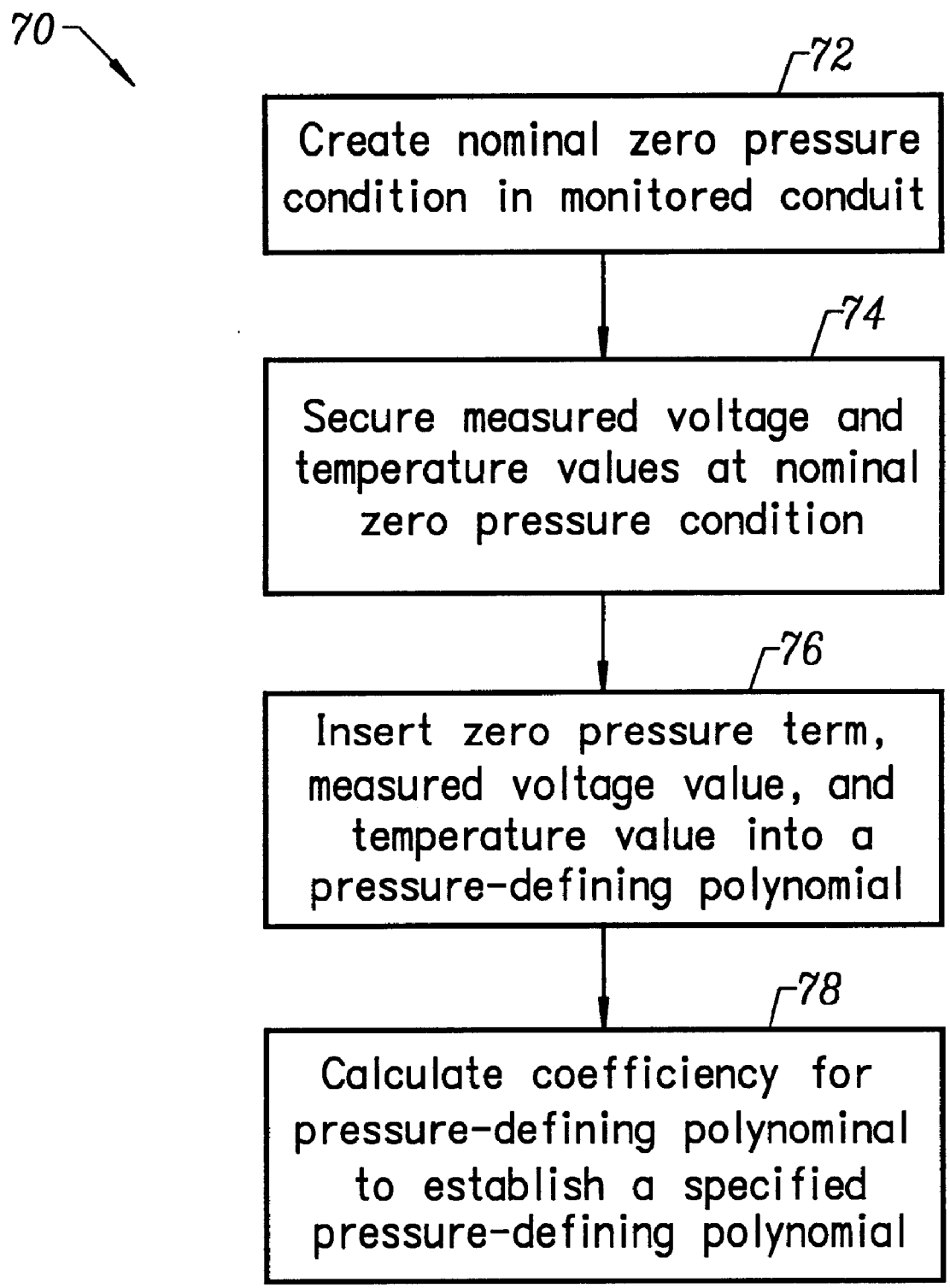
FIG. 5 illustrates processing steps associated with the first step of the process of FIG. 4.

Turning to FIG. 5, the first step in establishing initial parameters is to create a nominal zero pressure condition in the monitored conduit (step 72). That is, a low or zero pressure condition is applied to the conduit 24 of package 22. Then, measured voltage and temperature values are secured at the nominal zero pressure condition (step 74). That is, the bridge circuit 69 is used to obtain a measured voltage signal and the temperature sensor 28 is used to obtain a temperature value. Each of these signals is applied via bus 36 to the micro-controller 38.

A zero pressure value, the measured voltage value, and the measured temperature value are then inserted into a pressure-defining polynomial, such as Equation I (step 76). The number of coefficients required in the polynomial defines the number of pressure and temperature combinations required. For instance, $V^3 \times T^3$ requires sixteen data points. This is typically achieved by measuring four pressures at each of four temperatures. Preferably, the four temperatures span and slightly exceed the temperature range of operation. Similarly, the four pressures span and slightly exceed the pressure range of operation. One of the pressure points should be "zero", which is defined herein as a pressure below approximately 10 torr (<0.2 psia). Thus, step 76 contemplates the insertion of a zero pressure term, a measured voltage value at the zero pressure, and a temperature value at the zero pressure, plus additional nonzero pressure voltage and temperature values, as required to achieve an adequate fit for the polynomial. Subsequent references to a measured pressure or voltage value include multiple measured pressure and voltage values, as may be required.

The micro-controller 38, under the control of the initial parameter specification module 42, subsequently calculates the coefficients for the pressure-defining polynomial relying upon a zero pressure value, one or more measured voltage values, and one or more measured temperature values (step 78). This results in a fully-expressed pressure-defining polynomial, which is stored in memory 40. Alternately, a separate computer is used to execute this calculation, with the coefficients of the fully-expressed pressure-defining polynomial being downloaded into the memory 40.

The polynomial of Equation I with coefficients M0–M15 is provided by way of example. Other polynomials may be used and any number of techniques may be used to fit the polynomial coefficients for the measured values.

Returning again to FIG. 4, the next processing step is to operate the sensor in a standard mode (step 80). In the standard mode, as controlled by standard mode control module 44, measured voltage and temperature values are inserted into the pressure-defining polynomial, for example into Equation I, and a pressure (P) is calculated by the micro-controller 38.

A pressure sensor 30 may operate in this mode for an extended period of time. Eventually, however, the accuracy of the sensor 30 will begin to drift. Thus, a correction of the device is necessary. In accordance with the invention, the micro-controller 38 is configured to identify a calibration command (step 82). By way of example, the calibration condition identification module of the micro-controller 38 may be configured to identify a calibration command in the form of a pressure signal less than 10 Torr and a 5 Volt full-scale command given to the proportional controller 26 and the integral controller 36 for a period greater than thirty seconds. Other external conditions applied to the functional elements associated with the sensor may also be used, as will be appreciated by those skilled in the art. In response to such a condition, a nominal zero pressure sensor drift correction factor is established. The processing associated with this operation is disclosed in connection with FIG. 6.

Figure 6:
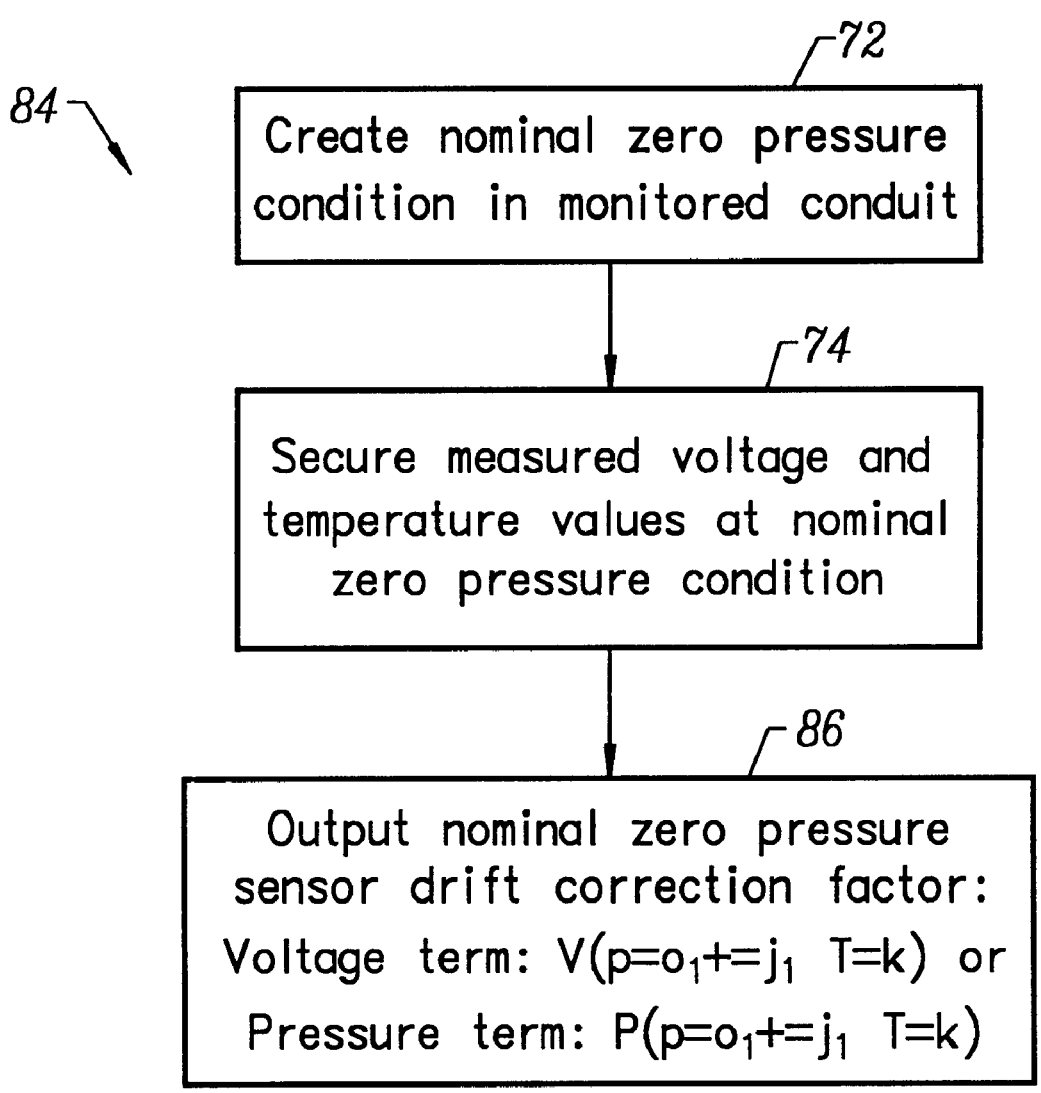
FIG. 6 illustrates processing steps associated with the penultimate step of the process of FIG. 4.

The first step shown in FIG. 6 is to create a nominal zero pressure condition in the monitored conduit (step 72). This is the same step described in connection with FIG. 5. Measured voltage and temperature values are then secured at the nominal zero pressure condition (step 74). This step is the similar to the step described in connection with FIG. 5, but in this instance, the measured voltage value will be presumably different than the initial reading, reflecting the drift of the sensor 60. The micro-controller 38, operating in conjunction with the sensor drift calculation module 48, then outputs a nominal zero pressure sensor drift correction factor, such as a voltage term $V(P=0, t=j, T=k)$ indicating a voltage value V at a zero pressure condition (P=0) at time j (t=j) and temperature k (T=k). Alternately, a pressure term may be used as an output, such as a pressure term $P(P=0, t=j, T=k)$, indicating a pressure value P at a zero pressure condition (P=0) at time j (t=j) and temperature k (T=k).

Returning to FIG. 4, the final processing step shown is to adjust the sensor output in view of a nominal zero pressure sensor drift correction factor (step 88). This step may be implemented with the sensor drift adjustment mode operation module 50. As indicated above, the nominal zero pressure sensor drift correction factor may be a voltage term $V(P=0, t=j, T=k)$ or a pressure term $P(P=0, t=j, T=k)$. In the case of the voltage term, a new variable V* is inserted into the specified pressure-defining polynomial. The new variable V* is expressed as:

$$V^*(P=x, t=j, T=k)=V(P=x, t=j, T=k)-V(P=0, t=j, T=k) \quad \text{(Equation II)}.$$

Thus, the nominal zero pressure sensor drift correction factor $V(P=0, t=j, T=k)$ is subtracted from a presently measured voltage signal $V(P=x, t=j, T=k)$, with the difference being inserted as the voltage term of the specified pressure-defining polynomial. Furthermore, the first coefficient of the pressure-defining polynomial, $M_o$, is set to zero in Equation I. Observe that at the initial calibration point (t=0), $V^*(P=0, t=0, T=k)=0$.

To account for the temperature dependence of the resistor at zero pressure, the following polynomial is solved:

$$V(P=0, t=0, T=k)=N(P=0, t=0)+N_1{}^*T_k+N_2T_k{}^2 \quad \text{(Equation III)}.$$

At some later time, t=j, $V(P=0, t=j, T=k)$ is measured. $N(P=0, t=j)$ is then solved using $V(P=0, t=j, T=k)$ to replace $V(P=0, t=0, T=k)$ in Equation III. Then $$V^*(P=x, t=j, T=k)=V(P=x, t=j, T=k)-(N(P=0, t=j)+N_1{}^*T_k+N_2T_k{}^2) \quad \text{(Equation IV)}$$

V* from Equation IV is now used with the original coefficients from equation I to solve for the pressure (P) at time j (t=j) and at temperature k (T=j).

Recall that the specified pressure-defining polynomial has coefficients defined by the original zero pressure condition. The voltage term (V*) processed at this time accounts for sensor drift at a specific temperature, as reflected in the term $V(P=0, t=j, T=K)$.

Experience demonstrates that for nominal zero pressure conditions (P=0), pressures below 10 Torr should be used. If higher "zero" pressures are used, the accuracy of the calibration degrades. For subsequent calibrations, "zero" pressure should be equal to or lower than the original, otherwise accuracy is degraded.

The foregoing explains the use of a voltage term as a sensor drift correction factor. Those skilled in the art will appreciate that the initial set of coefficients for the pressure defining polynomial may be calculated using the V* term. Specifically, the value of V* at its initial calibration point (V*=0) may be inserted into Equation I. The Mo term is set to zero and the coefficient values are calculated based upon a zero pressure term, a measured temperature at zero pressure, and additional temperature and pressure values, as required to establish a fit.

The use of a voltage term as a sensor drift correction factor has now been fully described. As indicated above, a pressure term may be also used as a sensor drift correction factor. In particular, at times after calibration, the original coefficients are used to calculate a pressure reading based upon the "zero" pressure signal at that time. This pressure, $P(P=0, t=j, T=k)$, is then subtracted from all pressures subsequently calculated. Mathematically, for all values where X>0, the adjusted pressure is calculated as follows:

$$P^*(P=x, t=j, T=k)=P(P=x, t=j, T=k)-P(P=0, t=j, T=k) \quad \text{(Equation V)}.$$

$(P=x, t=j, T=k)$ and $P(P=0, t=j, T=k)$ are calculated using the specified pressure-defining polynomial (for example a polynomial as in Equation I). P* is calculated by the micro-controller 38 using Equation V. P* is then used as the actual pressure sensed. Periodically, this procedure is repeated. That is, $P(P=0, t=j, T=k)$ is acquired and the algorithm is updated accordingly. The procedure is repeated in a similar manner if processing according to Equation IV is used.

The foregoing description, for purposes of explanation, used specific nomenclature to provide a thorough understanding of the invention. However, it will be apparent to one skilled in the art that the specific details are not required in order to practice the invention. In other instances, well known circuits and devices are shown in block diagram form in order to avoid unnecessary distraction from the underlying invention. Thus, the foregoing descriptions of specific embodiments of the present invention are presented for purposes of illustration and description. They are not intended to be exhaustive or to limit the invention to the precise forms disclosed, obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents.

What is claimed is:

1. A method of correcting drift in a sensor, said method comprising the steps of:

creating a nominal zero pressure condition in a conduit associated with the sensor;

identifying a calibration command;

establishing a nominal zero pressure sensor drift correction factor for said sensor relying upon a calibration voltage value and a calibration temperature value secured at said nominal zero pressure condition; and adjusting sensor output according to said nominal zero pressure sensor drift correction factor.

2. The method of claim 1 further comprising the following steps performed prior to said identifying step:

securing a measured voltage value and a measured temperature value at said nominal zero pressure condition;

inserting a zero pressure term, said measured voltage value, and said measured temperature value into a pressure-defining polynomial; and calculating coefficients for said pressure-defining polynomial to establish a specified pressure-defining polynomial.

3. The method of claim 2 wherein said adjusting step includes the step of adjusting a new measured voltage signal with said nominal zero pressure sensor drift correction factor to establish a compensated voltage signal.

4. The method of claim 3 further comprising the step of inserting said compensated voltage signal into said specified pressure-defining polynomial.

5. The method of claim 1 wherein said adjusting step includes the step of adjusting a measured pressure signal with said nominal zero pressure sensor drift correction factor.

6. The method of claim 1 wherein said identifying step is responsive to a predetermined set of conditions applied to functional elements associated with said sensor.

* * * * *